(12) United States Patent
Wang et al.

(10) Patent No.: US 7,283,215 B2
(45) Date of Patent: Oct. 16, 2007

(54) METHOD AND APPARATUS FOR FLUID VELOCITY MEASUREMENT BASED ON PHOTOBLEACHING

(75) Inventors: Guiren Wang, 10039 Willow Cove Rd., Huntsville, AL (US) 35803; Hong Jiang, Huntsville, AL (US)

(73) Assignee: Guiren Wang, Columbia, SC (US)

( * ) Notice: Subject to any disclaimer, the term of this patent is extended or adjusted under 35 U.S.C. 154(b) by 35 days.

(21) Appl. No.: 11/368,063

(22) Filed: Mar. 3, 2006

(65) Prior Publication Data
US 2007/0206179 A1 Sep. 6, 2007

(51) Int. Cl.
*G01P 3/36* (2006.01)
(52) U.S. Cl. ........................................ 356/28
(58) Field of Classification Search .............. 356/28
See application file for complete search history.

(56) References Cited

U.S. PATENT DOCUMENTS 4,866,639 A * 9/1989 Adrian .................... 356/28
6,653,651 B1 * 11/2003 Meinhart et al. ........... 250/573
2004/0118217 A1 * 6/2004 Hirano et al. .............. 73/861
2005/0176156 A1 * 8/2005 Hirano et al. ............. 436/172

* cited by examiner

*Primary Examiner*—Thomas H. Tarcza
*Assistant Examiner*—Luke D. Ratcliffe

(57) ABSTRACT

Methods and apparatus for fluid flow velocity and flow rate measurement are provided. Fluid velocity is measured in optical method based on fluorescence photobleaching of a fluorescent dye. The invented method and apparatus requires a calibration relation between flow velocity and fluorescence signal and is easy to use. The invented method and apparatus can measure bulk flow velocity and flow rate inline, two and three components of flow velocity vector. It can also measure flow velocity in near wall region using evanescent wave. Since the invented method and apparatus uses molecular dye and calibration relation between flow velocity and fluorescence signal, it has ultra high spatial and temporal resolution. The invented method can be used not only to apparatuses and devices in conventional size, but also to that in MEMS and NEMS.

20 Claims, 10 Drawing Sheets

METHOD AND APPARATUS FOR FLUID VELOCITY MEASUREMENT BASED ON PHOTOBLEACHING

CROSS-REFERENCE TO RELATED APPLICATIONS

Not Applicable

INCORPRATED-BY-REFERENCE OF METARIAL SUBMITTED ON A COMPACT DISC

Not Applicable

BACKGROUND OF THE INVENTION

1. Field of the Invention

This invention relates to velocity of flow rate measurement of fluid flow. In particular, the invention involves the use of photobleaching of fluorescence dye to measure the fluid flow velocity, including direction, of the fluids in devices. The invention can be employed in a wide variety of applications including, but not limited to, the processes, apparatuses, devices and instrument in scales of conventional, millimeter, micro and nanometer. This invention is non-intrusive and capable of measuring flow velocity inline, point measurement, two dimensional and three dimensional flow fields with high temporal and spatial resolution.

2. Description of Related Art

The measurement of fluid velocity by fluorescence photobleaching is known in the art. Reviews of the measurement of fluid velocity with fluorescence photobleaching are presented in the following references:

C. A. Monnig and J. W. Jorgenson, Anal. Chem., 1991, 63, 802-807;

A. W. Moore and J. W. Jorgenson, Anal. Chem., 1993, 65, 3550-3560;

B. P. Mosier, J. I. Molho and J. G. Santiago, Exp. Fluids, 2002, 33, 545-554;

K. F. Schrum, J. M. Lancaster, S. E. Johnston and S. D. Gilman, Anal. Chem., 2000, 72, 4317-4321;

J. L. Pittman, K. F. Schrum and S. D. Gilman, Analyst, 2001, 126, 1240-1247;

J. L. Pittman, C. S. Henry and S. D. Gilman, Anal. Chem., 2003, 75, 361-370.

H. E. Fiedler and G. R. Wang, Deutsches Patent, 19838344.4, 1998, Germany;

J. Ricka, Exp. Fluids, 1987, 5, 381-384;

J. White and E. Stelzer, Trends Cell Biol., 1999, 9, 61-65;

B. Storrie, R. Pepperkok, E. Stelzer and T. E. Kreis, J. Cell Science, 1994, 107, 1309-1319.

G. R. Wang Laser-induced fluorescence photobleaching anemometer for microfluidic devices. *Lab on a Chip*, 2005, 5, 450-456.

For instance, fluorescence recovery after photobleaching (FRAP), which can be used to measure very low flow velocity near the region of Brownian motion, requires two laser beams at the detection point. One is high laser beam intensity to cause the photobleaching and the other one is used to measure the recovered fluorescence intensity due to molecular diffusion for a long time period. The new method can measure the flow velocity instantaneously with only one beam and the velocity range measured is higher than the molecular diffusion. The two points based method in Pittman et al. (2003) also requires two laser beams and the first one bleaches the fluorescence and the second one has to be in the downstream of the first one in a distance to measure the bleached fluorescence signal. This method can only measure the bulk flow velocity and the temporal resolution is limited, since it has to wait for the bleached dye plug to translate from the first laser beam to the second one. Photobleached Fluorescence Visualization in Mosier (2002) requires camera to monitor images of flow field at different downstream positions to calculation flow velocity. Also a diffusion model is required. Rick (1987) published only qualitative method to visualize flow velocity, where the optical setup, detector and flow used for calibration were different from the real detector and flow. This make the quantitative measurement impossible, since the calibration relationship between velocity and fluorescence intensity is different from that in real flow. Also the calibration was linear. All these method cannot measure spatial velocity distribution, neither can they measure velocity vector, i.e. transverse velocity components.

The present invented method is a different way from aforementioned methods to measure flow velocity, although it also use photobleaching. In the invented method, the optical setup, detector and the flow are all the same to be able to carry out precise quantitative measurement. The calibration relationship in current method is not necessarily linear, but can also be a polynomial or exponential relation. Since the invented method is based on a single point measurement, it can measure velocity distribution in the transverse direction with high spatial resolution; the velocity is directly measured with the calibration relationship between flow velocity and fluorescence intensity, and thus the invented method has high temporal resolution and can be used for inline or online flow velocity or flow rate monitoring. Since molecular tracer dye is used for the invented method, the spatial resolution is high and can be used to devices of Micro-Electro-Mechanical Systems (MEMS) and Nano-Electro-Mechanical Systems (NEMS) compared with Particle Image Velocimetry (PIV), Laser Doppler Anemometry (LDA) and Ultrasound Velocimetry. Using evanescent wave guide, the invented method can also measure flow velocity in near solid wall region.

BRIEF SUMMARY OF THE INVENTION

The present invention represents an advance in the art of flow velocity measurement, specifically the fluid flow velocity measurement based on photobleaching in single spatial point. The single spatial point means that the flow velocity is measured directly at point of the excitation light beam and no wait is required either for the bleached signal to come at another beam downstream of the first one, or for the fluorescence intensity to recover. The invented method cannot measure molecular diffusion, but convection flow velocity, i.e. much higher than molecular diffusion. The flow velocity is measured and calculated by measured fluorescence intensity, based on a calibrated relationship between flow velocity and fluorescence intensity. The mechanism behind the calibration relationship is the fluorescent dye can photobleach when excited by excitation light: the higher the flow velocity is, the less bleaching time for the dye is, and thus, the higher the fluorescence signal at the detection point of the illuminated region. The fluorescence signal is detected by an optical detector and the velocity is calculated in the light of the calibrated relationship. The spatial resolution is determined by the excitation light dimension, and the pinhole size in frontal of the detector. The sensitivity depends on the laser power, dye concentration, dye property, beam size, PH value and temperature. The temporal resolution depends on the laser power at the detection volume, dye property (bleaching time constant), PH value and temperature.

The present invented apparatus and method allow real-time resolution, inline velocity measurement, three dimensional velocity components measurement, high spatial and temporal resolution velocity measurement, and velocity distribution measurement in a flow field. The present invention can also measure near wall velocity with evanescent wave.

The invention is described in more detail below. Those skilled in the art will recognize that the examples and embodiments described are not limiting and that the invention can be practiced in many ways without deviating from the inventive concept.

DETAILED DESCRIPTION OF THE INVENTION

Figure 1:
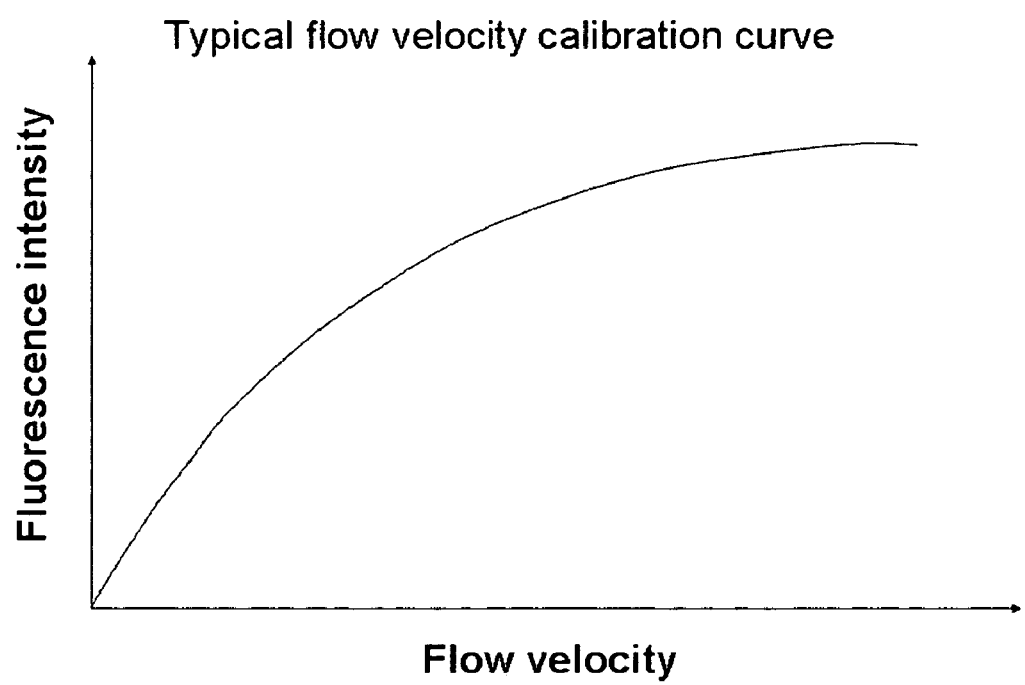
FIG. 1 is a typical calibration relation between fluorescence intensity and flow velocity.

The invented method requires a calibration relationship between the flow velocity and fluorescent intensity. FIG. 1 is a typical calibration relation between fluorescence intensity and flow velocity, where the fluorescence intensity increases linearly with flow velocity when the flow velocity is small (but larger than molecular diffusion). With the increase of the velocity, the fluorescence intensity increases with the velocity nonlinearly. With further increase of the velocity, the fluorescence intensity saturate with the velocity. The velocity to be measured should be within the calibration range. There are several methods that can carry out the calibration. An easy way is to measure the fluorescent signal at the detection point for a given optical setup with a given flow velocity. For example, the bulk average flow velocity can be calculated once the flow rate is known. The flow rate can be obtained from, but not limited to, the pump flow rate reading. Record each fluorescent signal for different flow rates to obtain the calibration relation. Another method is the flush time measurement. One example is to generate a dye plug in the channel, or an interface between dye solution and non-dye solution at a given position for a given flow velocity. Then monitor the time trace of the fluorescent signal. The traveling time of the plug or interface from the position where it is injected (generated), to the detection point can be used to calculate the flow velocity since the distance between the injection position to the detection point is known. The calibration can also be measured by traveling the flow channel on a translation stage while the flow is at rest. The flow velocity is regarded as the velocity of the translation stage. The calibration relationship can be obtained through measuring the fluorescence signals at a detection point corresponding to different translate stage velocity.

To increase the accuracy of the measurement, aspect ratio of the excitation beam can be increased, when the transverse velocity component that is in parallel to the excitation light propagation direction, is not negligible. This can reduce the influence of the dye molecules that transport from the cross surface of the excitation light beam into the detection volume.

The invented method measures the flow velocity through measuring the fluorescent signal. Since the fluorescence intensity changes with source light power, which can fluctuate, relative fluorescence intensity could be used to reduce the error caused by source light power fluctuation. The relative fluorescence intensity is the ratio of fluorescent intensity to a reference source light power, which can, but not limited to, be a fraction of source light signal, measured with a photodetector through a beam splitter or a mirror.

Figure 2:
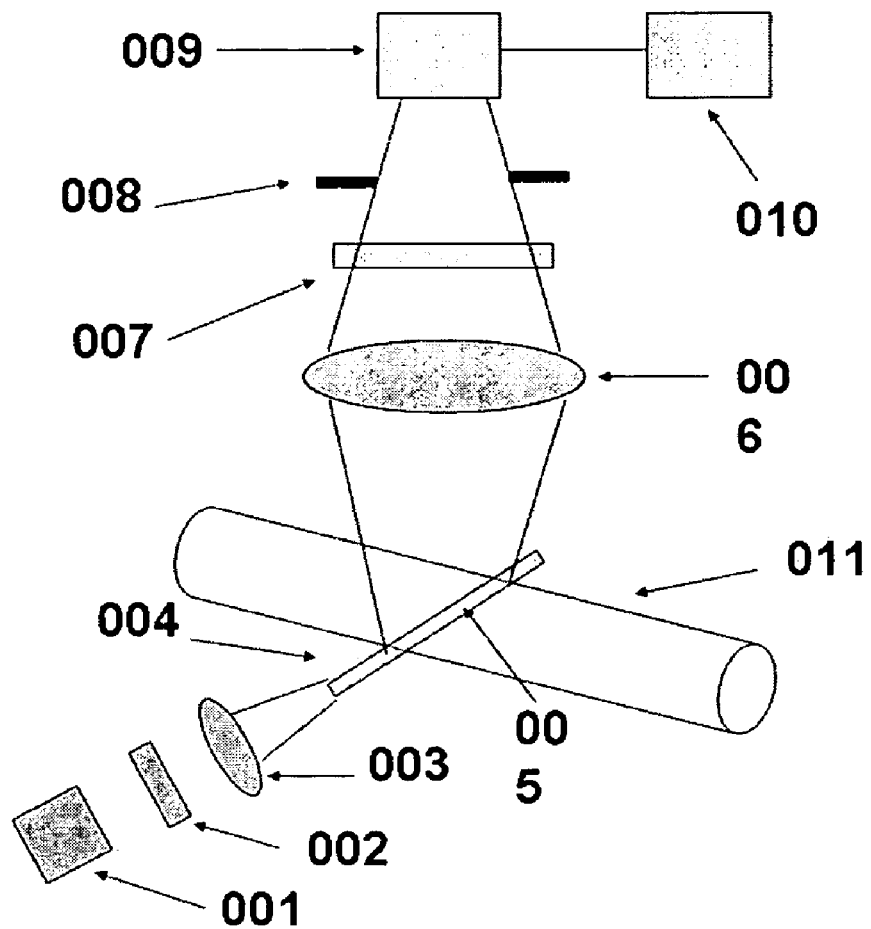
FIG. 2 is a schematic of the measurement system of the average bulk flow rate in a channel.

In the first embodiment of the invention as shown in FIG. 2, an exciting light beam 004 from light source 001 is required to illustrate and passes through a detection point 005 of the flow field in transverse direction of a flow channel 011 for measuring bulk flow velocity. The light intensity should be sufficiently high to cause photobleaching of a fluorescent trace dye. The light source can be, but not limited to, a laser, mercury lamp, halogen lamp, xenon lamp, LED and etc. A fluorescent trace dye will be used to generate fluorescence signal. The stronger the photobleaching of the dye, the higher the sensitivity of the method. There is a photodetector 009 to receive the fluorescence signal. The detector can be, but not limited to a CCD camera, CMOS camera, photodiode, avalanche, photomultiplier tube (PMT) and etc.

The following methods can be applied to improve the sensitivity and signal to noise ratio, spatial and temporal resolution. A lens 003 can be used to manipulate or focus the exciting light onto the detection point 005 to increase the exciting light intensity there and an optical filter 002 can be used between the exciting light source and the detection point to filter away all other wavelength light and only pass the exciting wavelength light. A collection lens 006 can be located between the detection point and detector to image the signal to the detector. A pinhole 008 can be used between the detector and detection point to image the signal to the detector. An optical filter 007 can be placed between the detection point and the detector to filter away all noise and only pass the fluorescence signal. The output signal from the detector can be sent to a data processor 010, for example, a computer for data procedure to calculate flow velocity or flow rate.

Figure 3:
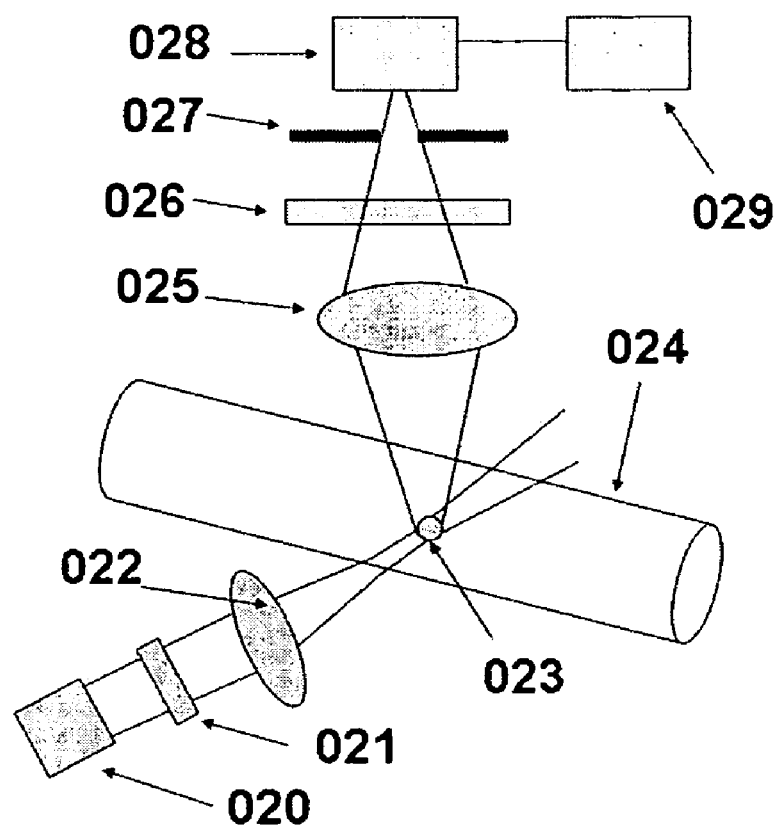
FIG. 3 illustrates the point measurement for measuring velocity distribution of a flow field in a flow chamber.

In a second embodiment in FIG. 3, the invention comprises similar optical and detector components to the first embodiment, except that the purpose here is to measure different spatial point in transverse direction. The light from the source 020 is focused to a small beam point 023 as detection point in the flow channel 024 to measure flow velocity at this particular spatial point. With the change of the focus point in transverse direction, the flow field in the transverse direction can be measured. Similar to the first embodiment, there are also optical filter 021 and lens 022 for manipulating the light source, and lens 025, optical filter 026 and pinhole 027 for manipulating fluorescent signal to the detector 028, whose output signal is transferred to data processor 029 for velocity calculation.

Figure 4:
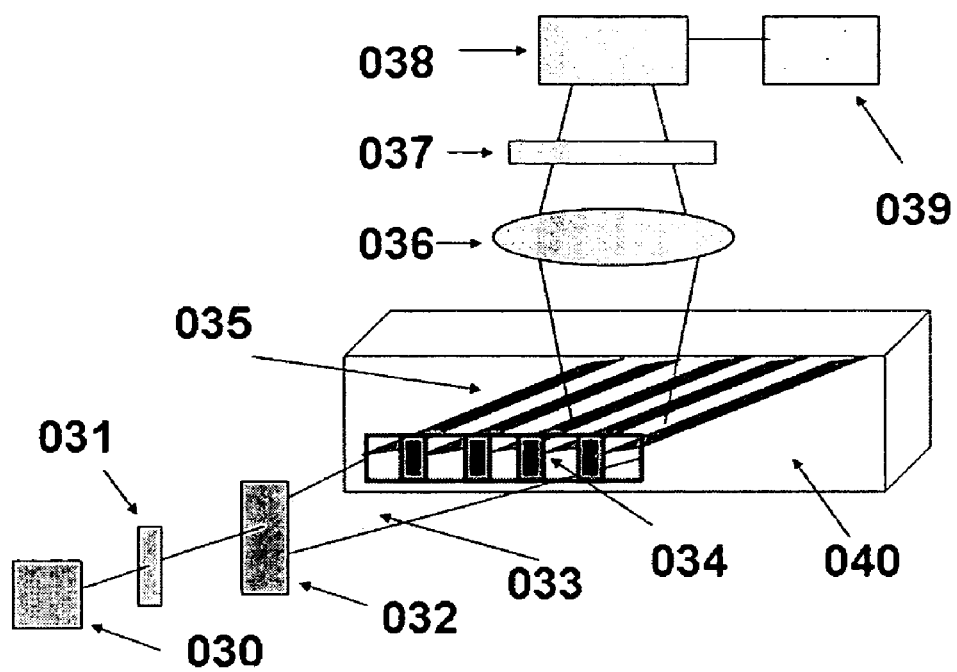
FIG. 4 is a schematic of measurement of two-dimension flow field with periodic illumination of the field.

FIG. 4 is a third embodiment for measuring two dimensional flow field. The light beam from light source 030 is spread with a cylindrical lens 032 to generate a light sheet 033. There is a light screen 034 which can periodically block the sheet light spatially to generate periodic light sheet 035 in the flow field of the flow channel 040 to be measured. The signal from the periodic light sheet 035 is recorded to the detector 038 and then sent to the data processor 039 for velocity calculation. To improve the measuring system, optical filter 031 and 037 can be used for excitation light and emission signal light respectively, and a collection lens can be used to image the signal to the detector, as in FIG. 2. Since fluorescence intensity increases with the increase of flow velocity, two-dimensional light sheet without the screen can also be used to measure flow velocity.

Figure 5:
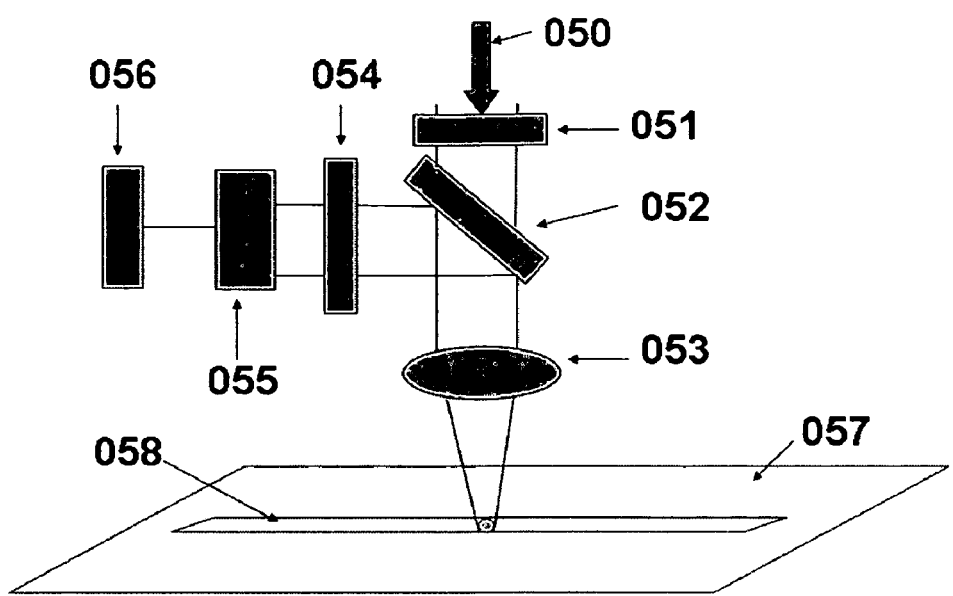
FIG. 5 represent a case in, but not limited to, an epi-fluorescecne microscope.

The embodiment in FIG. 5 is with an epi-fluorescence microscope for miniaturized (nano- and microfluidics) systems. The source light 050 pass through an optical filter 051, a dichroic 052, and a lens 053 and is focused to the detection point in the flow channel 058 of a device, such as, but not limited to a chip 057. The fluorescent signal is collected through the lens 053 and the dichroic 052 and an optical filter 054, and is imaged to the detector 055, and sent to data processor 056.

In cases where the sidewalls of the flow channel is not optically transparent, the excitation light cannot illuminate the detection point through sidewall, but can enter the detection point from top or bottom of the channel with a angle between 10-350° to the top surface. The collection lens of the fluorescence signal of the detection system can have an angle between 10-350° to the excitation light.

Figure 6:
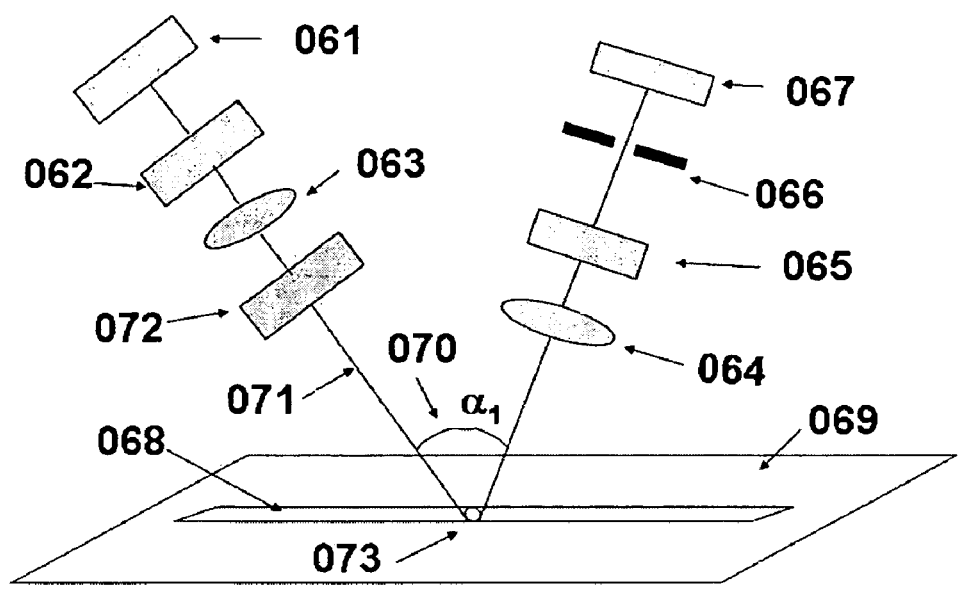
FIG. 6 is a different optical arrangement of FIGS. 1 and 2. It does not require the axial direction of excitation light to be orthogonal to that of the detection system.

In the embodiment of FIG. 6, there is an angle $\alpha_1$ 070 between exiting light and axial direction of collection lens 064. The angle can be in the range of 10-350°. There can also be, but not limited to, an optical filter 062 and a focusing lens 063 to focus the excitation light beam 071 to the detection point 073 in a flow channel 068 of a device or a chip 069. The exciting light beam 071 from source light 061 can also be a sheet at detection point, if a cylindrical lens 072 is added. For detection of the fluorescent signal, a collection lens 064, an optical filter 065, a pinhole 066 and a detector 067 are used.

Figure 7:
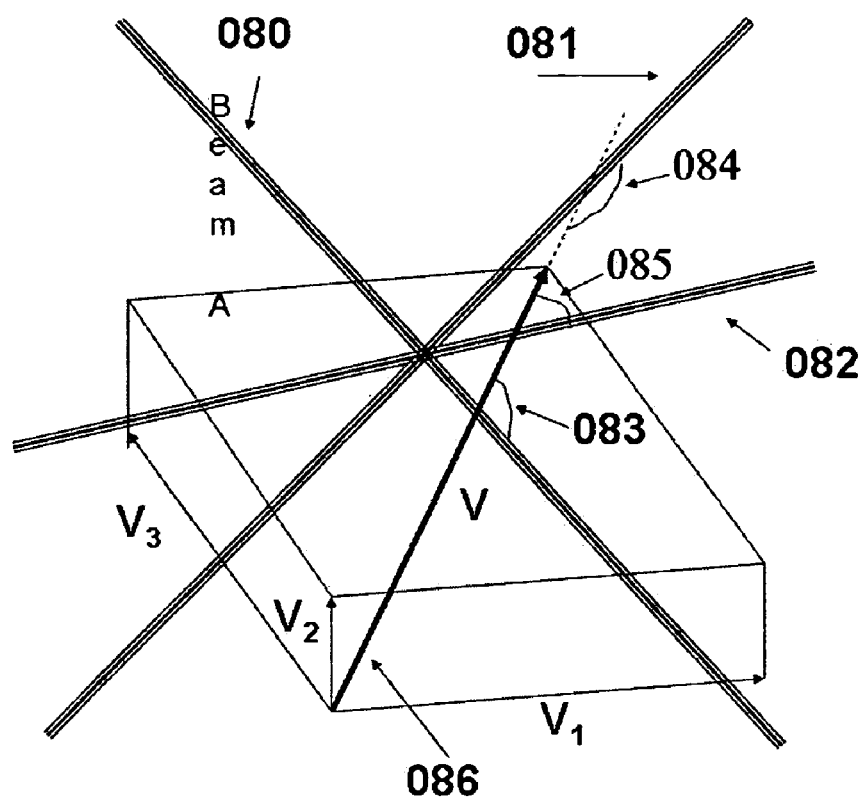
FIG. 7 shows multi-beams with an angle between 10-350° for the velocity vector components and vorticity measurement.

In order to measure velocity vector components, multi excitation light beams with an angle between 10-350° from each other are required. The orthogonal light beams from each other are more preferred as shown in FIG. 7. The effective velocity $V_{A.eff}$, $V_{B.eff}$ and $V_{C.eff}$ of flow velocity V for light beam A 080, light beam B 081 and light beam C 082 is $$V_{A.eff} = V \cos \alpha \quad (1)$$

$$V_{B.eff} = V \cos \beta \quad (2)$$

$$V_{C.eff} = V \cos \gamma \quad (3)$$

respectively, where $\alpha$, $\beta$, and $\gamma$ is the angle between beam A 080 and velocity V, 083, beam B 081 and velocity V, 084 and beam C 082 and velocity V, 085 respectively. One example of calculating flow velocity is, but not limited to, to apply following equations:

$$V_{A.eff}^2 = V^2(\sin^2 \alpha + b^2 \cos^2 \alpha) \quad (4)$$

$$V_{B.eff}^2 = V^2(\sin^2 \beta + b^2 \cos^2 \beta) \quad (5)$$

$$V_{C.eff}^2 = V^2(\sin^2 \gamma + b^2 \cos^2 \gamma) \quad (6)$$

$$V^2 = \frac{V_A^2 + V_B^2 + V_C^2}{2 + b^2} \quad (7)$$

where b is a constant. If only two dimensional velocity components are required, only the first two light beams will be used.

FIG. 7 is an embodiment for measurement of three components of velocity vector. Two or three orthogonal (but not limited to orthogonal) excitation light beams A 080, beam B 081 and beam C 082 are used in the detection point. Each excitation light can have its own light source or they can share one light source through beam splitters. Each excitation light beam has its own detection system and detector components. The optical components for each excitation light path, and the optical components for detection path are similar to their counterparts in FIG. 3. In order to reduce noise due to cross talk of the multi light beams, the excitation light can be different in wavelength for each beam, and each excitation light beam can has its own dye, which has different emission light wavelength from that of the other light beams. Each detector will have a corresponding optical filter to filter away the noise from the other beams. With one detector, such as a camera, the two fluorescence signals can also be measured and distinguished. This can be realized by partition of pixels into two regions, and each region measure one beam fluorescence signal.

Figure 8:
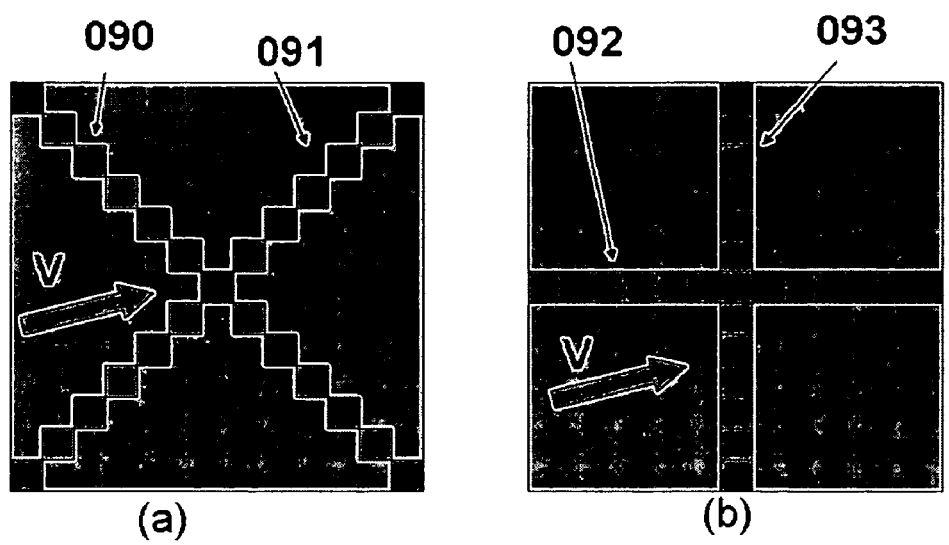
FIG. 8 illustrates the two dimensional velocity measurement in a light sheet with arrangement of selected orthogonal pixel lines from a detector, such as, but not limited to a camera.

FIG. 8 is a different embodiment for the measurement of velocity vector components. This is a two-dimensional image of fluorescent signal in a two-dimensional flow field. In FIG. 8, two orthogonal pixel lines (pixel array) consisting of multi-pixels are selected. FIG. 8 shows two examples (but not limited to) of pixel lines, used for calculation of the velocity components. The pixel line functions as the excitation light beam in FIG. 7. The fluorescent signal from a pixel line is similar to that of a beam in FIG. 7. In FIG. 8a, the orthogonal pixel array lines 091 and 092 are consisted of multi pixels, which are connected through the vertex. In FIG. 8b, the orthogonal pixel line 092 and 093 are consisted of multi pixels, which are connected through two side of a pixel.

Figure 9:
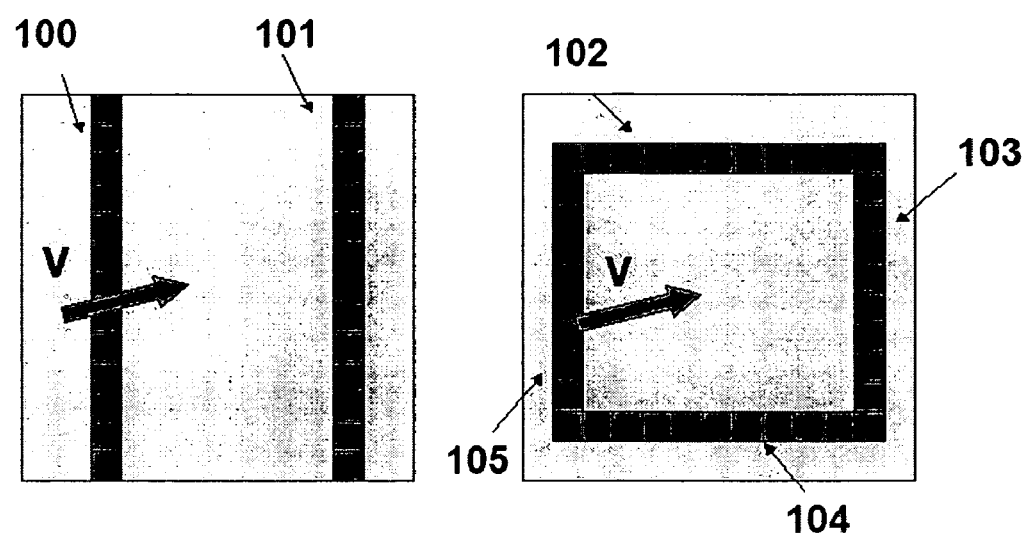
FIG. 9 illustrates the two dimensional velocity measurement in a light sheet with arrangement of selected parallel pixel lines from a detector, such as, but not limited to a camera.

FIG. 9 is a different embodiment for the measurement of velocity vector components from that in FIG. 8. The main difference in FIG. 8 and FIG. 9 is that the pixel lines in FIG. 8 are in cross, while the pixel lines FIG. 9 are in parallel. The signal in FIG. 9 can be used to measure not only velocity vector component, but also vorticity. FIG. 9 shows two examples (but not limited to) of pixel lines, used for calculation of the velocity components. In FIG. 9a, the parallel pixel array lines 100 and 101 are consisted of multi pixels similar to the pixel line 092 in FIG. 8. These pixel lines can be used to measure velocity component orthogonal to them. In FIG. 9b, two pairs of parallel pixel lines 102 and 104, 103 and 105 are used to measure two orthogonal velocity components and corresponding vorticity.

Figure 10:
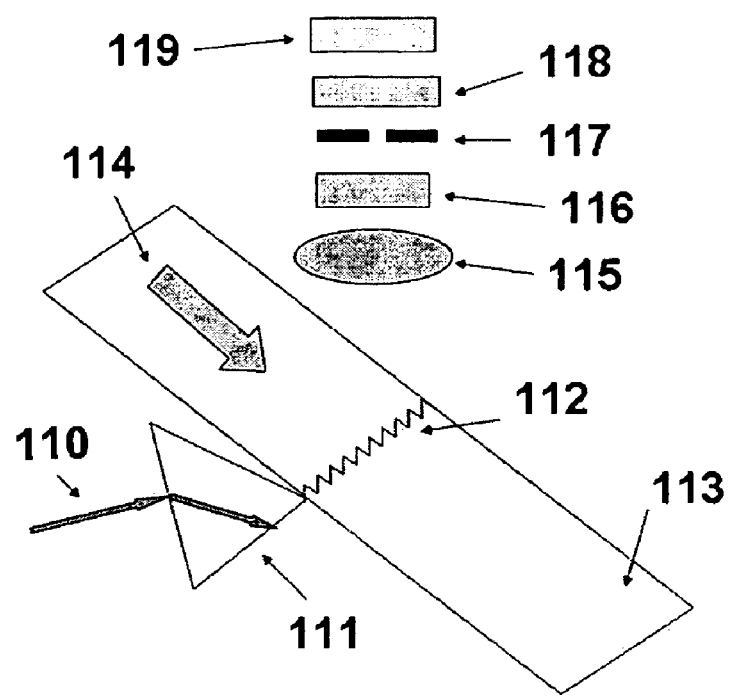
FIG. 10 depicts an example of near wall velocity measurement with evanescent wave.

The invented method can also measure flow velocity at near wall region with ultra high spatial resolution, since it is a molecular dye tracer based method. To achieve a very thin excitation light, we can use evanescent wave illumination as shown in FIG. 10. In the embodiment of FIG. 10, the source light 110 pass through a prism 111 to generate a evanescent wave illumination 112, which can be normally very thin, in the order of 200 nm thick. The evanescent wave illumination is generated on the solid surface of a flow channel 113. 114 is an example of the fluid flow direction. The light can be a sheet or a line. The collection system include a collection lens, filter, pinhole 117, detector 118 and data processor 119.

APPENDIX A

We have developed a novel, non-intrusive fluid velocity diagnostic method based on laser-induced fluorescence photobleaching for microfluidic devices. The residence time of a fluorescence dye in a laser beam depends on the flow velocity and approximately corresponds to the decay time of the photobleaching of the dye in the laser beam. The residence time is inversely proportional to the flow velocity. The fluorescence intensity increases with the flow velocity due to the decrease of the decay time. A calibration curve between fluorescence intensity and known flow velocity should be obtained first. The calibration relationship is then used to calculate the flow velocity directly from the measured fluorescence intensity signal. The new method is demonstrated for both pressure driven flow and electroosmotic flow.

It is not easy to measure fluid velocity instantaneously with the traditional advanced anemometers, such as Hot Wire Anemometer and Laser Doppler Velocimetry, due to its small size. There are many techniques to measure the velocity or mobility in microchannels for either pressure driven flow or electroosmotic flow. The easiest method to measure the flow velocity is the tracking of neutral markers by measuring the flush time of a neutral marker from injection to detection point[3-15]. Sample weighing[16-17] can measure the velocity, but could be less accurate due to evaporation and sensitivity of the balance. In Conductivity cell[8-19] and Current monitoring[20-24] average electroosmotic flow (EOF) is measured by observing changes in current and conductivity respectively versus time. The velocity can also be determined by measuring Streaming potential[25-27] or Caged-fluorescence visualization[28-29]. Nuclear magnetic resonance has also been used to measure flow velocity in the research group[30-33]. The most successful method that applies traditional advanced anemometer, is micro Particle Image Velocimetry (μPIV)[34-36], but it is difficult to be applied to commercial instruments. Photobleached Fluorescence Visualization[37-39] and line writing technique[40,41] with photobleaching are also developed to measure the flow velocity. However, all the methods mentioned above can neither measure transient velocity with high temporal and spatial resolution simultaneously, nor be easily used in commercial instrument for online EOF velocity monitoring. Most methods for velocity measurements in electroosmotic flows are referred to a recent review from Devasenathipathy and Santiago (2002)[42].

The goal of the present work is to develop a diagnostic method that can easily measure transient velocity with potentially high temporal and spatial resolution and make online monitoring of the flow velocity possible in microfluidic devices. Here we call it as Laser-Induced Fluorescence Photobleaching Anemometer (LIFPA). Recently, Wang and Fiedler[43] found that the laser intensity was so high, due to the fine focusing of the laser beam to approximately 4 μm, that the photobleaching became important. Photobleaching resulted in a negative effect for concentration measurements based on LIF, because when flow velocity is sufficiently low, fluorescence intensity depends not only on dye concentration, but also on the flow velocity. It was suggested that this mechanism could be used to measure flow velocity in a patent[44]. Ricka[45] has qualitatively implemented this method for flow visualization in Benard-Marangoni flow. However, they have not published any flow field measurement. To the author's knowledge, LIFPA has never been used to qualitatively measure flow velocity, nor be used in microfluidic channels, especially for electroosmotic flow.

Theoretical Background

The background of this work is based on a simplified model illustrating the relationship between fluorescence intensity and fluid velocity for a given dye concentration due to laser-induced fluorescence photobleaching (LIFP)[43]. In the model, fluorescence intensity of dye increases with fluid velocity at the measuring point due to the LIFP. Such a phenomenon is considered as a negative effect for concentration measurement based on LIF, since we assume that the fluorescence intensity depends only on dye concentration.

However, if we take advantage of such a relationship, LIFP can be used as the theoretical background for the velocity measurement when the dye concentration is a constant[44]. FIG. 1 is a cartoon of the photobleaching process within a laser beam. It is well known that the photobleaching can be described as an exponent decay of fluorescence intensity $I_f$ with time $t$[46]

$$I_f = I_{f0} * e^{-t/\tau} \quad (1)$$

where $I_{f0}$ represents fluorescence intensity at $t=0$; $\tau$ denotes photobleaching time constant, e.g. half decay time.

Suppose fluid velocity perpendicular to laser beam is u, beam width is $d_f$ and the average dye residence time in the beam is t, then $$t = d_f/u \quad (2)$$

$$I_f = I_{f0} * e^{-d_f/(u\tau)} \quad (3)$$

This is the simplified model of the LIFPA, where fluorescence intensity $I_f$ is directly related to flow velocity u. Eq 3 indicates that for a given system (dye, buffer, and laser beam property), $I_f$ increases with u. If $I_f$ is known, u can be calculated using eq 3. The signal from the optical detector increases with the total photo emission from the measuring volume. The residence time t of the dye molecular in the laser beam is averaged. Therefore, the smaller the laser beam, the more accurate the model.

In reality, $\tau$, as a system parameter, is dependent of laser intensity at the detecting point, beam width, specific dye and buffer, dye concentration $C_d$ and buffer concentration $C_b$. Since it is difficult to establish the relationship theoretically, the parameter $\tau$ will be determined through experiment. For instance, using several known values of flow velocity u and their corresponding $I_f$ values, we can determine the value of $\tau$. Another useful way is to directly calibrate the relationship between $I_f$ and u. The calibration can be either a curve or polynomial. With the calibration relation, any instantaneous u can be calculated through the measurement of $I_f$. The second method is selected in this work.

Experimental Section

The microfluidic chip of a Y-channel was fabricated. PDMS patterned using negative SU-8 molds was used to create flow channels and bonded to glass plate via irreversible (plasma) bonding. The Y-channel chip is 5 cm long, 100

µm wide and 50 µm high. A Harvard syringe pump and a Cole Parmer pump were used to drive syringes containing fluorescence dye solution and pure buffer solution respectively to the microchannel.

The electroosmotic flow (EOF) was driven by a high voltage supplier 610D from Trek Corporation. Two thin platinum wires 125 µm in diameter that served as electrodes were inserted at the inlet well (pipette) and outlet well (also pipette) of the channel, respectively. The inlet of the channel had high voltage and the outlet was grounded.

Fluorescein sodium salt from Sigma-Aldrich Corporation was used as the dye for the present work. Contrast to conventional fluorescence based diagnostics, the present study desires fluorescence dye with strong photobleaching property. Since photobleaching can be enhanced with the increase of dye concentration[43], a high concentration fluorescein dye solution was used in the present study to increase photobleaching. Although fluorescein has high absorption at the wavelength of 488 nm, our test shows that UV light around 337.5-356.40 nm gives stronger photobleaching and higher sensitivity. Note the sensitivity is not the fluorescence intensity, but the ratio of fluorescence intensity to flow velocity. 1M HEPES solution from Calbiochem Corporation was utilized as buffer and was diluted with DI water to a concentration of 50 mM. The dye was diluted with the same buffer concentration to a concentration of 100 µM. The dye and buffer solution flow into the main channel from different Y-channel inlets respectively, but not simultaneously.

The optical setup is shown in FIG. 2. A Saber Krypton laser from Coherent Corporation was used as the exciting light. The laser power was set to 700 mW for multiline of UV light (337.5-356.40 nm). The laser beam is expanded with a beam expander to 5 mm in diameter and then focused through a cylindrical lens in a sheet with thickness of approximately 25 µm at the detecting point. The beam was projected towards the microchannel at an angle of 45°. The measuring spatial resolution corresponding to the spot size of the focused laser beam is approximately 0.18 nL. A photomultiplier tube H6780-04 from Hamamatsu Corporation was used as an optical detector in the vertical direction of the detecting point. An optical band pass filter in the range of 405-475 nm was disposed in front of the photomultiplier tube. The signal was recorded as electrical voltage in an Infiniium Oscilloscope, 2 GSa/s, 4 channels, HP 54825A from Agilent Corporation Experimental Results Signal transduction. Our first experiment is to explore whether there exists a measurable signal of fluorescence intensity that is a function of flow velocity, and to verify eq 3. The dependence of $I_f$ on u is shown in FIG. 3, where $I_f$ as a trace decreases with the reduction of flow rate for a time course. Here only one stream of dye solution was used, so that the dye concentration is constant at the detection position. In the initial stage, the flow rate Q was set at 1 µl/min. After a period of run, the flow and dye concentration in the channel became steady. Then the signal was recorded as a trace for a period time, during which, we periodically reduced the flow rate. In FIG. 3, the signal was recorded for 15 s with the flow rate $Q_1$=1 µl/min. During this period, the fluorescence intensity (arbitrary unit) was nearly constant at 107.5. As long as the flow rate was kept constant, $I_f$ was also constant. Then the flow rate was switched rapidly to the flow rate of $Q_2$=0.8 µl/min. The signal of fluorescence intensity is then observed to also decrease correspondingly and quickly. This procedure was repeated until Q was reduced to $Q_8$=0.02 µl/min with $I_f$=22.5. Finally when $Q_9$=0 µl/min, $I_f$ gradually decreased to 2.75. As we know, the flow velocity inside the main channel increases with the flow rate, FIG. 3 clearly displays that $I_f$ increases with u, and this is qualitatively identical to eq 3. FIG. 3 shows that the fluorescence intensity increases with flow velocity when other parameters are fixed. Thus, LIFP can be used as signal transduction for flow velocity measurement in microchannel.

Calibration process. The LIFPA requires calibration between fluid velocity and fluorescence intensity. This means we should first measure the corresponding $I_f$ for each known flow velocity, and then establish a relationship between $I_f$ and u. Such a relation can either be a general calibrated curve, an exponential equation, or even more general, a polynomial, such as $$u = a_0 + a_1 I_f + a_2 I_f^2 + a_3 I_f^3 + a_4 I_f^4 + a_5 I_f^5 + \quad (4)$$

We use a polynomial here. For a microfluidic system, the flush time measurement of the sample can be used to determine a steady fluid velocity for a given dye concentration and optical system. The flush time here means the sample migration time from a known injection position to the detection position in the main channel. Either pressure driven flow or EOF can be used for calibration. We used pressure driven flow for the calibration in the present work.

The calibration process is described as following. For the Y channel, the channel with inlet A supplied dye solution with buffer and the other with inlet B provided pure buffer solution without dye. First, the buffer solution was driven through the main channel with a pump. After the fluorescence signal became steady, the flow was stopped. Next, we pumped the dye solution for less than 1 s and stopped. Then quickly started to pump the buffer solution again in less than 1 s and counted the start time. There was a peak of $I_f$ in the time trace when the dye slug passed through the detecting point. For example, with Q=0.1 µl/min, we observed the peak at t=143 s as shown in FIG. 4. Due to Taylor dispersion, the time corresponding to $(I_f)_{max}/2$ (at t=140 s) from the rising point (at t=137 s) was approximately regarded as the flush time. As the channel length is known, the average velocity for a given flow rate setting could be calculated after obtaining the flush time. We obtained the calibrated relationship between $I_f$ and u with filled square symbols shown in FIG. 5 after repeating the same process for several different flow rates.

Based on the calibrated data from FIG. 5, a polynomial for the calibration relation was obtained:

$$u = a_0 + a_1 I_f + a_2 I_f^2 + a_3 I_f^3 + a_4 I_f^4 + a_5 I_f^5$$

$$a_0 = -2.0432472170927346E-01$$

$$a_2 = 7.6186023325807803E-02$$

$$a_2 = -5.2267668251621564E-03$$

$$a_3 = 1.3558472650065237E-04$$

$$a_4 = -1.4651807110217420E-06$$

$$a_5 = 5.7832240630262838E-09 \quad (5)$$

Such a relationship is also shown in FIG. 5 as the calibration curve in the non-linear fit line. Therefore the signal of $I_f$ can be used to measure fluid velocity. FIG. 5 shows that at a very low velocity range, the relation between $I_f$ and u can approximately be described linearly, e.g. in the range of 0.065-0.32 mm/s. However, with the increase of the velocity, the rate of increase slows down and eventually displays a trend of saturation, i.e. the fluorescence intensity will not increase with the flow velocity. In this case, the sensitivity of the measurement is greatly reduced for high flow velocity. For this reason, the calibration curve in FIG. 5 is only suitable for velocity measurement within the calibrated velocity range of 0.065-3.5 mm/s to warrant the sufficient sensitivity of the measurement. The calibration polynomial eq 5 should not be extrapolated outside the calibration data range.

Verification in pressure driven flow. To validate the calibration curve for the velocity measurement, we use the same way of measuring the calibration curve to verify LIFPA for measuring the flow velocity with the calibration curve. For each given flow rate, we measure the fluorescence intensity and the corresponding flush time. The measured u based on the flush time measurement versus its corresponding $I_f$ is also shown in FIG. 5 with symbols of unfilled circle for comparison. The coefficient of determination between the calibration curve and the measured data for verification, i.e. R-squared value, is 0.99. The error bar that is the standard deviation obtained from more than 20 events, is also shown in FIG. 5. The error bar increases with velocity. However, the relative velocity error does not increase with the velocity, since the absolute velocity value is high. The average relative error is 3.2% at the highest velocity of U=3.5 mm/s, and 3.7% at the lowest velocity of U=0.065 mm/s. The error source could be pump pressure and laser power fluctuation and detection point temperature fluctuation. FIG. 5 demonstrates that, for each fluorescence intensity value, the measured velocity matches very well with the calibration curve and confirms that the calibration curve can be used to measure the flow velocity in the microchannel.

Measurement of EOF. The calibration curve can be applied to measure flow velocity not only in pressure driven flow, but also in EOF or the combination of pressure driven and EOF as long as the velocity is within the range of the calibration curve. Here we will demonstrate a case of the application of LIFPA to EOF.

For EOF, only voltage was used to drive the flow. Similar to FIG. 3 in pressure driven flow, for a given voltage U between the electrodes from the inlet and outlet of the microchannel, $I_f$ was also a constant in EOF. We run different voltages ranging from 0 to 2700 V, and measured the corresponding values of $I_f$. The measured relationship between $I_f$ and U is displayed in FIG. 6, which clearly shows that $I_f$ increases with voltage, similar to the relation between fluorescence intensity and flow velocity. This is expected, since flow velocity $u_E$ of EOF increases with electric field intensity, i.e. voltage here.

Using eq 5 we can easily calculate the flow velocities $u_E$ of the EOF in FIG. 6 corresponding to different values of voltage. The corresponding relationship between flow velocity and voltage is shown in FIG. 7 as filled square symbols. Apparently $u_E$ linearly increases with voltage, indicating that the mobility was constant. Note the measurement is also extrapolated to the lowest $u_E$=0.021 mm/s and it fits very close to the linear relation of $u_E$ and voltage, probably because the nearly linear relationship between flow velocity and fluorescence intensity. The error bar is also shown in FIG. 7. The error bar is obtained from more than 20 events during 10 minutes. The highest $u_E$ is within the calibration range and its relative deviation is 2.5%. The relative deviation of the lowest EOF $u_E$ is 2.8%. The error could also results from the voltage fluctuation of power supplier.

To validate the estimated velocity in FIG. 7 from the calibration curve in FIG. 5, the flush time measurement was again used to measure flow velocity $u_E$ of EOF for different voltage. To measure the flush time, we switched on the high voltage power supplier between inlet A and outlet electrodes for a given voltage, and ran the experiment over a sufficient amount of time to fill the dye solution from the inlet A to the outlet. After the filling, we turned the electricity off between the inlet A and outlet, and turned on the electricity between the inlet B and outlet at the same voltage for about 1 s to provide an injection of buffer solution slug without dye. Then the connection between the inlet B and outlet was quickly turned off. The connection between the inlet A and outlet was turned on immediately again at the same voltage. We count the time as the starting time. When the buffer slug arrived at the detecting point, there was a dip in the trace of $I_f$. Through this process, we can minimize the usage of the pure buffer solution to reduce the influence of EOF mobility difference between the dye and pure buffer solutions, if any.

The measured $u_E$ using flush time is represented in FIG. 7 as unfilled circles. The R-squared value between the velocities obtained from the calibration curve and flush time measurement is 0.99. FIG. 7 demonstrates that the velocity calculated using eq 5 matches very well with the measured $u_E$. Therefore, the calibration curve for LIFPA can be used to calculate velocity with the measured fluorescence intensity regardless whether flow is pressure driven or EOF.

The exponential relationship between fluorescence intensity and flow velocity is normally not a favorable scaling for experimental measurement, since at high velocity the sensitivity is relatively low. However, the calibration curve of FIG. 5 between fluorescence intensity and flow velocity is similar to that between voltage and flow velocity of Hot-Wire Anemometer widely used in fluid mechanics[48]. We should not use the range near saturation between flow velocity and fluorescence intensity, where the sensitivity is poor. Current work used high concentration dye to increase the photobleaching for the dynamic range of 0.065-3.5 mm/s with sufficient sensitivity. In the high velocity range of the pressure driven flow, the ratio of velocity to fluorescence intensity is 0.2. The deviation of fluorescence intensity for the highest velocity is 0.13. The corresponding relative velocity deviation caused by the deviation of fluorescence intensity is about 2.9%. For EOF, since the maximum velocity is only 0.81 mm/s, the sensitivity is relatively high, and the velocity deviation of the EOF caused by fluorescence deviation is 2.3%.

Another issue need to address is that the low velocity limitation is not zero for the dynamic range, even though the relationship between fluorescence intensity and flow velocity is nearly linear. When the flow is slow enough that it is comparable to the diffusion time of the dye molecule into and out of the laser focus, this technique will no longer be able to tell what the flow velocity is as the extremely low limit is approached. (The presented method is not intended to measure flow velocity, where Brownian motion is important since it is very difficult to measure that low limitation with flush time. For velocity near the region of Brownian motion, fluorescence recovery after photobleaching (FRAP) should be considered[49,50].) In currently work, the calibrated lowest velocity is 0.065 mm/s. The velocity deviation is not high at low velocity range, since the relationship between flow velocity and fluorescence intensity is nearly linear and the sensitivity is very high at low velocity (the ratio of velocity to fluorescence intensity is 0.0060). The standard deviation of the fluorescence intensity is 0.0025, which causes a relative velocity deviation of 3.5% for pressure driven flow and 1.6% for EOF at the lowest velocity respectively.

At relatively low velocity range, the relation is approximately linear as shown in FIG. 5 and Ricka's work[45]. The linear range, dynamic range and sensitivity can be increased by enhancing photobleaching. For microfluidics in bioanalytical systems, flow velocity is often in the range of 10 μm/s-10 mm/s. This can easily be measured with sufficiently high sensitivity, if we focus laser to a cylindrical spot[43] instead of sheet in the present manuscript for a laser beam with power of several hundreds of milliWatt. The present work used laser sheet for different purpose, and thus reduced the laser intensity in the detecting probe volume. We can also use other dyes with strong photobleaching to increase the sensitivity.

Although photobleaching has been applied to measure flow velocity with different mechanisms[37-41, 49,50] as mentioned in the introduction, LIFPA seems to be a novel method and shows several advantages. For instance, FRAP mainly measures velocity of the order of molecular diffusion and has to wait for relatively a long time for recovery. Current method measures convection velocity much higher than that of molecular diffusion directly with the calibration relationship between flow velocity and fluorescence intensity, and thus, has a very high temporal resolution compared with FRAP. The response time of LIFPA is related to the fluorescence photobleaching kinetics or decay time constant, which can be several hundreds of microseconds[43]. The decay time constant can be further reduced by enhancing photobleaching. Current method measures fluorescence intensity only at one spatial point, and does not need to measure different downstream changes in fluorescence intensity simultaneously, and thus, has high spatial and temporal resolution simultaneously and is easy to use. However, current method requires calibration. Compared with the work of Ricka, which uses similar method with photobleaching, the theoretical model presented in this manuscript is very simple and would be helpful for readers without advanced mathematics background. The flow velocity in the calibration curve of the current work has also been expanded one order higher (note the laser power is less than half of that used in Ricka's work). The main reason is the use of high dye concentration.

Although the present work only introduces the measurement of local bulk flow velocity, the spatial resolution of LIFPA could be very high because it is based on molecular tracer. Since the waist of the laser beam is limited by diffraction and can be focused to even less than 1 μm in diameter, the spatial resolution for a point measurement with 1 μm spatial resolution is possible. LIFPA could also be applied to measure two-dimensional velocity field with a camera[45]. Due to the fast response, LIFPA can be used to measure instantaneous flow velocity and monitor the flow velocity online, when the signal of fluorescence intensity is calculated by a computer using the calibration eq 5. FIG. 3 is actually an example of online velocity monitoring.

LIFPA is based on the one to one relationship between fluorescence intensity and flow velocity. Therefore, any other parameter that has an effect on fluorescence intensity should be avoided. For the velocity measurement, the dye solution should be kept constant, since fluorescence intensity strongly depends on the dye's concentration. Fluid temperature should also be kept constant since fluorescence intensity also depends on the temperature[48]. Buffer solution should also be kept constant, if fluorescence intensity depends also on PH[46].

The principle of LIFPA is not limited to the laser, and can also be applied to other light source, so long as the photobleaching becomes sufficiently strong for the measurement to have sufficient sensitivity. With the exception of flush time measurement, any other method of velocity measurement can also be used to measure flow velocity for calibration.

We have demonstrated a novel and non-intrusive anemometer based on laser-induced fluorescence photobleaching for microfluidic devices. A simplified model is used to describe the mechanism of the anemometer. A calibration curve between fluorescence intensity and flow velocity is initially required for this method. The calibration curve can be obtained with the measurement of a fluid flush time. With the calibration curve, the flow velocity can be easily and directly obtained from the measured fluorescence intensity signal for both pressure driven flow and electroosmotic flow. The method is validated to match very well with the measured velocity acquired with the measurement of the flush time.

What is claimed is:

1. A method of measuring fluid flow velocity or flow rate in a flow channel of an apparatus comprising:
   a. A fluorescence trace dye mixed in the fluid, which has a photobleaching property and its fluorescence intensity increases with the flow velocity;
   b. optical windows in the fluid device for accepting an external light to excite said dye in said fluid and allowing optical detector to measure the fluorescence signal, which can be either fluorescence intensity or relative fluorescence intensity;
   c. applying an external excitation light source to said fluid with said dye to induce fluorescence;
   d. an optical detection system to measuring the fluorescence signal, and
   e. a calibration relationship between flow velocity and fluorescence signal to calculate flow velocity based on the measured fluorescence signal.

2. The method of claim 1 wherein
   a. optical setup used for said calibration is the same as the real optical setup used for said velocity measurement;
   b. optical setup used for said calibration is not the same as the real optical setup used for said velocity measurement, however, the quantitative relation between fluorescence intensity of optical setup used for said calibration and that of optical setup used for real measurement is known.

3. The method of claim 1 wherein said excitation light is laser, mercury, halogen, xenon lamp or LED and the light source is continuous or pulsed.

4. The method of claim 1 wherein said excitation light is a beam cross flow channel to measure bulk flow velocity or flow rate.

5. The method of claim 1 wherein said excitation light is a focused beam point to measuring flow velocity distribution in the flow field and the length of said beam can be controlled with a pinhole in front of said detector.

6. The method of claim 1 wherein the light is a two-dimensional light sheet to measuring flow velocity distribution in the flow field.

7. The method of claim 1 wherein there is a screen to generate periodic beams for two-dimensional velocity field measurement.

8. The method of claim 1 wherein two parallel beams are closely located at the detection point to measure velocity, and also vorticity, whose component is in the same direction of said beams.

9. The method of claim 1 wherein the excitation light can be two beams in cross with an angle to measure velocity vector and shear stress components and each beam has a corresponding detector unit, which can be a. two different detectors system;

b. two assigned pixel regions in a camera or a diode array and each region measures one beam signal.

10. The method of claim 1, wherein two source light beams with different wavelength and two dyes with different emission wavelength fluorescence premixed with said fluid are used for reducing cross talk noise from different beams and each detector has a corresponding optical filter for its emission light signal to pass.

11. The method of claim 1 wherein the excitation light can be evanescent wave for near wall velocity measurement, wherein, the spatial resolution can be controlled and defined by a pinhole or a slit before said detector.

12. The method of claim 1 wherein there is an optical filter between daid detector and flow field measured to filter away noise light.

13. The method of claim 1 wherein said detector and excitation light have an angle between 10-350°.

14. The method of claim 1 wherein an optical detector is used to monitor the source light power and this signal is used as a reference signal to calculate relative fluorescence intensity to measure flow velocity to reduce influence of source light power fluctuation.

15. The method of claim 1 wherein said photobleaching is enhanced by increasing excitation light intensity at the detection point, dye concentration, using dyes with strong photobleaching to increase sensitivity and temporal resolution.

16. An apparatus of measuring fluid flow velocity or flow rate in a flow channel of an apparatus comprising:

a. a fluorescence trace dye mixed in the fluid, which has a photobleaching property and its fluorescence intensity increases with the flow velocity;

d. optical windows in the fluid device for accepting an external light to excite said dye in said fluid and allowing optical detector to measure the fluorescence signal, which can be either fluorescence intensity or relative fluorescence intensity;

e. applying an external excitation light source to said fluid with said dye to induce fluorescence;

d. an optical detection system to measuring the fluorescence signal, and e. a calibration relationship between flow velocity and fluorescence signal to calculate flow velocity based on the measured fluorescence signal.

17. The apparatus of claim 16 wherein the excitation light is two beams in cross with an angle to measure velocity vector and shear stress components and each beam has a corresponding detector unit, which comprises a. two different detectors systems or;

b. two assigned pixel regions in a camera or a diode array, each region measures one beam signal.

18. The apparatus of claim 16 wherein said detector and excitation light can have an angle between 10-350°.

19. The apparatus of claim 16 wherein an epi-fluorescence microscope is used for velocity or flow rate measurement.

20. The apparatus of claim 16 wherein an optical detector is used to monitor the source light power.

* * * * *